US012785341B2

(12) United States Patent
Dobler

(10) Patent No.: US 12,785,341 B2
(45) Date of Patent: Nov. 3, 2026

(54) BUILT-IN CONNECTOR

(71) Applicant: Neutrik AG, Schaaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 363 days.

(21) Appl. No.: 18/565,278

(22) PCT Filed: Jun. 23, 2022

(86) PCT No.: PCT/EP2022/067138

§ 371 (c)(1),
(2) Date: Nov. 29, 2023

(87) PCT Pub. No.: WO2023/285096

PCT Pub. Date: Jan. 19, 2023

(65) Prior Publication Data

US 2024/0243534 A1 Jul. 18, 2024

(30) Foreign Application Priority Data

Jul. 12, 2021 (AT) .............................. A 50568/2021

(51) Int. Cl.

| | |
|---|---|
| ***H01R 24/64*** | (2011.01) |
| ***H01R 13/24*** | (2006.01) |
| ***H01R 13/52*** | (2006.01) |
| ***H01R 13/73*** | (2006.01) |
| *H01R 13/447* | (2006.01) |
| *H01R 13/504* | (2006.01) |
| *H01R 107/00* | (2006.01) |

(52) U.S. Cl.
CPC ......... *H01R 24/64* (2013.01); *H01R 13/2407* (2013.01); *H01R 13/5202* (2013.01); *H01R 13/5216* (2013.01); *H01R 13/73* (2013.01); *H01R 13/447* (2013.01); *H01R 13/5045* (2013.01); *H01R 2107/00* (2013.01); *H01R 2201/04* (2013.01)

(58) Field of Classification Search
None
See application file for complete search history.

(56) References Cited

U.S. PATENT DOCUMENTS 4,806,117 A 2/1989 Johnston
9,263,821 B2 * 2/2016 Pepe ...................... H01R 24/64
9,761,988 B1 9/2017 Lin
(Continued)

FOREIGN PATENT DOCUMENTS

CN 204516967 U 7/2015
CN 206907969 U 1/2018
DE 102013021296 B3 4/2015
(Continued)

*Primary Examiner* — Ross N Gushi
(74) *Attorney, Agent, or Firm* — Volpe Koenig

(57) ABSTRACT

An electrical connector, with RJ45 cable connectors, includes a housing having at least one insertion opening, a contact carrier, a contact set, a closure element which closes the housing on the rear face opposite the insertion opening, and at least one feedthrough for at least one electrical contact element. The contact set is at least mechanically connected to the closure element. The contact elements at the end of the contact set opposite the insertion opening are guided into or onto the rear face of the closure element.

13 Claims, 11 Drawing Sheets

(56) References Cited

U.S. PATENT DOCUMENTS

| | | | |
|---|---|---|---|
| 10,559,915 | B1 | 2/2020 | Pahulje et al. |
| 2017/0070015 | A1 | 3/2017 | Chen et al. |

FOREIGN PATENT DOCUMENTS

| | | | |
|---|---|---|---|
| EP | 1458062 | B1 | 8/2010 |
| EP | 3171461 | A1 | 5/2017 |
| EP | 2822487 | B1 | 10/2017 |
| EP | 3054754 | B1 | 12/2019 |
| WO | 2013111083 | A1 | 8/2013 |
| WO | 2015107507 | A1 | 7/2015 |
| WO | 2021058129 | A1 | 4/2021 |

* cited by examiner

BUILT-IN CONNECTOR

CROSS REFERENCE TO RELATED APPLICATIONS

The present application is a § 371 U.S. National Phase of International Patent Application No. PCT/EP2022/067138, filed Jun. 23, 2023, which claims priority of Austrian Patent Application No. A50568/2021, filed Jul. 12, 2021, the entire contents of all of which are incorporated by reference herein as if fully set forth.

FIELD OF THE INVENTION

The invention relates to an electrical connector.

BACKGROUND

Such connectors, realized as a socket of an item of equipment or as a chassis socket, are used to connect cable plug-connectors to data cables, inter alia. RJ45-type connectors represent a large field of application.

The chassis sockets typically comprise a housing having at least one insertion opening for at least one cable plug-connector, which housing is built into the wall of an item of equipment, a switchboard or the like. In such cases, as is apparent, for example, in WO 2021/058129 A1, there is a projecting connection flange, having recesses for fastening means, arranged at the insertion-side end of the housing. Also provided in most cases is an insertion-side flange plate, having an insertion opening for the complementary connector and having drilled mounting holes for connection to a wall of an item of equipment, a switchboard or the like. The rear side of the housing is substantially open, and only the contacts protruding on the rear side of the housing are mechanically and electrically shielded by an attached protective covering, although this protective covering does not form any fixing mechanical connection to the contact elements or the entire contact set.

The same also applies to the housing structures of EP 1458062 A2 or U.S. Pat. No. 4,806,117 A. These documents disclose housings composed of two halves and in which there are held contact sets that are composed of central insulating bodies and contact elements fixed therein. The contact sets are inserted into one housing half, while the other housing half does not affect any mechanically fixing connection to the contact set, but merely covers and mechanically protects the contact elements.

CN 204516967 U discloses a built-in connector in which a substantially flat sealing plate is inserted between the flange plate and the connection flange on the housing and seals the connection between these two components. A seal could also be inserted between the connection flange and the housing. The seal has a central cutout at the site of the insertion opening of the built-in connector. A rubber cap is often provided to enable the insertion opening to be closed tightly when in the non-connected state, i.e. when the complementary connector is not inserted.

Arranged inside the housing there is a contact carrier, which is realized as a separate component and can be inserted into the housing and fixed therein, but which may also be realized as an inner housing portion that is with the housing. In this contact carrier, at least parts of a contact set are fixed in a defined position. Such a contact set, which is Z-shaped in side view, as disclosed for example in CN 206907969 U or EP 2 833 487 A1, usually has a central portion having contact elements routed in parallel and having insulating bodies that adjoin this central portion on both sides and that enclose a further portion of the contact element, in that the contact elements are encapsulated with plastic, and fix them in their mutual position. Preferably in this case, individual pairs of contact elements are routed in a crossed manner within the insulating body, and the contact elements at one end of the contact set project into the insertion opening for the purpose of contacting a complementary connector inserted into the chassis socket. There are contact sets, or similar arrangements of contact elements, intended for RJ45-type built-in connectors, which connect through to a similar connector on the rear side, but which are then not tight when in the non-connected state and if no sealing cap is used or this has been forgotten, such that water and/or dust can enter the housing.

Many chassis sockets that have other contact arrangements, for example XLR connectors, or proprietary systems such as, for instance, powerCON® or speakON® of the applicant, often have, on their rear side opposite the insertion opening, a closure element that closes the housing, in many cases sealed by sealing rings, sealing compounds or the like, also against the passage of moisture and dirt from the insertion opening into the interior of the item of equipment or the switchboard. However, the closure element has at least one leadthrough for at least one electrical contact element. Due to the different contact arrangement, the different design of the contact carrier and the housing, these solutions are not suitable for built-in connectors for data connections.

Built-in connectors are known for data connections, i.e. having an RJ45-type contact arrangement, having with a circuit board that is inserted as a closure element into the housing of the chassis socket and fixed there. Due to the contact elements soldered into the circuit board, tightness can be achieved for a certain period of time, even in the non-connected state, by encapsulation of the back of the housing and the circuit board with a sealing compound. Since the soldered joints in the circuit board are not corrosion-resistant, however, tightness cannot be maintained in the long term.

The same also applies to embodiments of chassis sockets in which a further insertion opening for a data plug-connector is provided on the rear side. The contacts of the insertion opening on the front side of the chassis socket are soldered into a circuit board, and on the rear side soldered contacts go into the second, rear insertion opening. Here too, tightness cannot be maintained in the long term. In addition, such chassis sockets are very large on the rear side because the contacts have to be accommodated in a plastic housing that is in turn encased in thin metal sheath.

The object of the present invention was to overcome the disadvantages of the prior art and to create a device that can be flexibly matched to different requirements with the greatest possible compatibility with existing systems, designs and size specifications. In particular, it is to be possible in this regard to construct connectors for a wide variety of applications with a small number of different components, while, alternatively or in combination, the depth, i.e. the dimension in the direction of the axis of the insertion opening, and the tightness are to be achieved even without an inserted complementary connector.

This object is achieved by a device according to one or more of the features disclosed herein.

SUMMARY

To achieve the object in question, the device according to the invention is characterized in that the contact set is at least mechanically connected to the closure element, and the contact elements at the end of the contact set opposite to the insertion opening are routed into the closure element or onto the rear side of the closure element. It is thereby ensured that the connector socket can be provided with a wide variety of termination options on its rear side, for example a circuit board or card that is connected to the contact elements and that in turn can itself be connected to its own connector, to any other electrical lines or electronic circuits, or the like. However, the contact elements may also be connected directly to adjoining electrical lines or may, for example, also be routed to a further insertion opening that is orientated in the longitudinal direction, or also in the transverse direction, with respect to the longitudinal axis of the housing. The mechanical connection of the contact set and closure element allows the closure element to be securely fixed to the housing, thereby also improving the tightness of the housing and ultimately increasing the operational reliability of the connector.

According to a first embodiment of the invention, the closure element is formed by the base of a housing, and the contact elements are routed outward through leadthrough openings in the base and are fixed mechanically and in a sealing manner in the leadthrough openings by a press fit. In this way, all structural size specifications and standardized dimensions can be maintained with an optimum sealing effect from the insertion opening into the interior of the item of equipment. The base may be integral with the housing, which simplifies production considerably. Also possible is an embodiment having a plastic plate as a closure element, through which the contacts on the rear side are routed outward. Due to the high degree of tightness, the connector can also be used safely in exposed environments.

According to a further embodiment variant, the closure element is therefore realized as a circuit board having an electrical circuit and is inserted or attached in a sealed manner into or onto the rear side of the housing. The contact elements in this case are soldered to the circuit board. Due to the use of a complete contact set having contact elements routed in a crossed manner, termination to the circuit board on the rear side of the socket is easily compatible with conventional wiring patterns without any loss of performance, and elaborate compensation measures can be avoided.

In order to achieve the standard dimensions of conventional connectors and thus ensure the greatest possible compatibility with regard to structural size and dimensioning, the insulating bodies of the contact set preferably together enclose an obtuse angle of greater than 135 degrees along the course of the contact elements. This means that the contact set is substantially elongate, resulting in the desired structural size. Preferably, the insulating bodies lie in the same or in parallel planes, which are also orientated parallel to the longitudinal central axis of the housing of the chassis socket.

According to an advantageous embodiment, the ends of contact elements located next to each other in the insulating body are bent away from each other perpendicularly to the plane of the insulating body. In this way, the typically required spacing of the solder pads on the PCB can be easily maintained and optimum function ensured. Preferably, the contact elements are bent according to standardized contacting schemes and then connected to the circuit board, thereby ensuring the greatest possible compatibility.

According to a second, alternative embodiment variant, the closure element is realized as a housing cover having a passage for receiving and mechanically fixing at least one portion of the contact set. Any number of onward routings can thus be provided on the rear side of the closure element for the contact elements routed outward through the closure element, whilst providing optimum flexibility of use.

A preferred embodiment of this variant is one in which the passage comprises a central portion extending in the plane of the closure element, parallel to the plane of the rear peripheral edge of the housing, and respectively at least one input portion and output portion extending perpendicularly therefrom. This design, by means of retaining and positioning surfaces arranged in the central portion, in particular perpendicularly to the longitudinal central axis and direction of insertion, and parallel to this direction in the input and output portion, ensures that the contact set can be securely and correctly positioned in the housing during installation and then also remains securely in this predefined position during use of the connector, with frequent insertion and removal of the complementary connector.

In divergence from the above variant, also possible are embodiments of a closure element of the housing in the form of a housing cover, in which the angle between the input portion of the passage for the contact elements through the housing cover and the central portion of the passage is other than 90 degrees, since the central portion extends at an angle other than 0 degrees with respect to the plane of the housing cover, or to the rear end face of the housing. A rear insertion opening then extends parallel to this, with angles of between 90 degrees and 0 degrees in relation to the longitudinal central axis of the housing being possible. A contact set, of which insulating bodies adjoining the central, bent portion enclose precisely this angle, is used in this case.

Advantageously, to increase the retention effect, in particular in the longitudinal direction of the housing, it is provided that the input portion and output portion are offset from each other.

In order to ensure that, with the through-passage having this course through the rear closure elements of the connector according to the invention, the contact set can be easily inserted and positioned and is then fixed securely, a preferred embodiment of the invention provides that the contact elements have at least one bend in the central portion of the contact set, such that the insulating bodies enclose an angle of between 60 and 180 degrees on both sides of the bend. Preferably, a right angle is provided.

It is further provided for this purpose that one of the two insulating bodies is held fixed in the central portion of the passage and is aligned parallel to the plane of the closure element, parallel to the plane of the rear peripheral edge of the housing. This insulating body thus bears at least optimally against the retaining and positioning surfaces arranged perpendicularly to the longitudinal central axis and direction of insertion in the central portion of the passage through the closure element, ensuring a good retaining effect and precisely defined positioning of the contact set.

In order to ensure secure sealing of the connector even in the non-connected state and without a protective cap over the insertion opening, and thus to reliably prevent the ingress of dirt, dust or moisture from the insertion opening to the rear side of the closure element, according to an optional, advantageous embodiment of the invention at least a part of the central portion of the passage is filled in a sealing manner with a hardened filling compound. Preferably, at least a part of at least the input portion or the output portion is also sealed in this way in order to further increase the reliability of the sealing effect. While being applied, the sealing compound can penetrate into all small gaps and cavities and thus, following hardening, ensure comprehensive sealing, in addition to optimal mechanical connection between the contact set, closure element and housing.

An embodiment of the connector, in which the closure element is inserted into or attached to the rear side of the housing and connected to the housing, is both simple and proven in production. Preferred types of connection are adhesive bonding or ultrasonic welding.

To further increase and ensure the optimum sealing effect, there is preferably a sealing ring inserted between the closure element and the housing. It is positioned in a groove in at least one of these components, in order to precisely specify the position during the assembling of the connector and thus prevent the sealing effect from being impaired by poorly positioned sealing rings.

Of particular advantage is an embodiment of the connector according to the invention in which the contact elements of the insulating body held in the central portion of the passage, which are routed through the closure element to the rear side of the connector, are covered on four sides by a hood made of thin metal plate. However, one side is also kept open as an insertion opening, for at least one cable plug-connector. The direction of insertion in this case is preferably transverse to the longitudinal central axis of the housing, or to the direction of insertion at its front end. Particularly with this latter variant, the avoidance of plastic housings on the rear side of the chassis socket, in which the insertion openings are usually formed, makes it possible to achieve a significant shortening of the installation depth.

A further shortening of the installation depth is possible with a connector that has a locking arrangement, for a plug connector inserted into the insertion opening, which comprises a locking element and an actuating element, in that an actuating portion is arranged at the outermost rear end of the actuating element and is not overhung rearward by any portion of the actuating element. It is also important in this case that the locking element is also not overhung by the outermost rear end of the actuating element in any position. Compared to previous designs, in which the region actually active for unlocking is located in front of the rear end of the actuating element, this provides for a much shorter design of the actuating element, and thus also of the entire housing in which the actuating element is mounted in a shiftable manner.

A further contribution to optimum sealing is afforded by an embodiment of a connector according to the invention in which a projecting connection flange protrudes from the insertion-side end of the housing and has recesses for leading through fastening means, and the connector preferably has an insertion-side flange plate having an insertion opening for the complementary connector and having drilled mounting holes for connection to a wall of an item of equipment, a switchboard or the like, if a seal that leaves the insertion opening free is inserted between the connection flange and the housing or between the flange plate and the connection flange.

BRIEF DESCRIPTION OF THE DRAWINGS

To aid understanding of the invention, it is explained in greater detail with reference to the following figures.

In the figures, in each case in a highly simplified, schematic representation.

DETAILED DESCRIPTION OF THE PREFERRED EMBODIMENTS

By way of introduction, it is to be noted that, in the differently described embodiments, parts that are the same are denoted by the same reference designations, or the same component designations, and the disclosures contained in the description as a whole can be transferred analogously to parts that are the same and have the same reference designations, or the same component designations. The positional indications selected in the description, such as, for example, at the top, bottom, side, etc., also relate to the figure directly described and represented and, in the case of a change in position, these positional indications to be transferred analogously to the new position.

Figure 1:
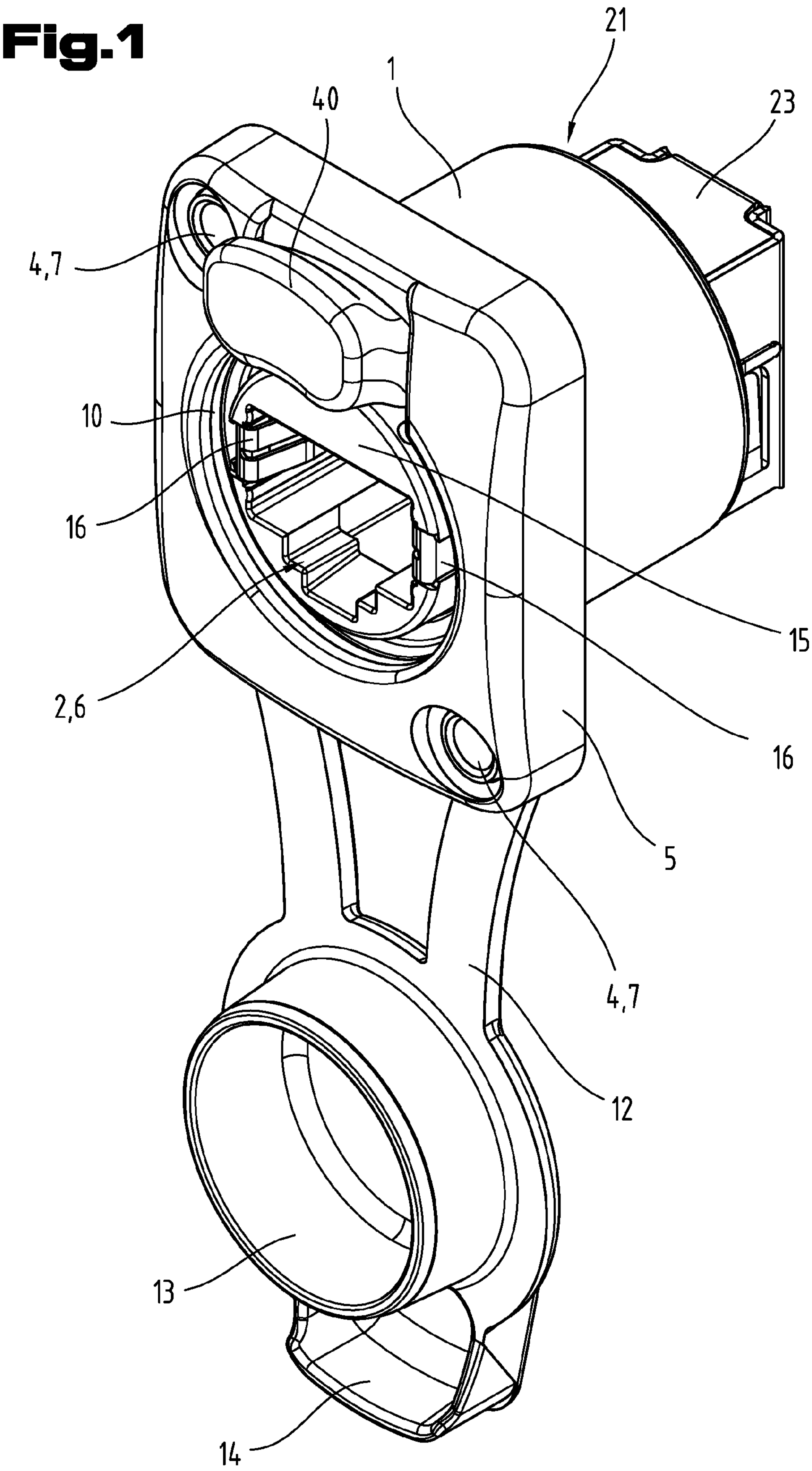
FIG. 1 shows a preferred embodiment of a chassis socket according to the invention, in an oblique front view from above.
Figure 2:
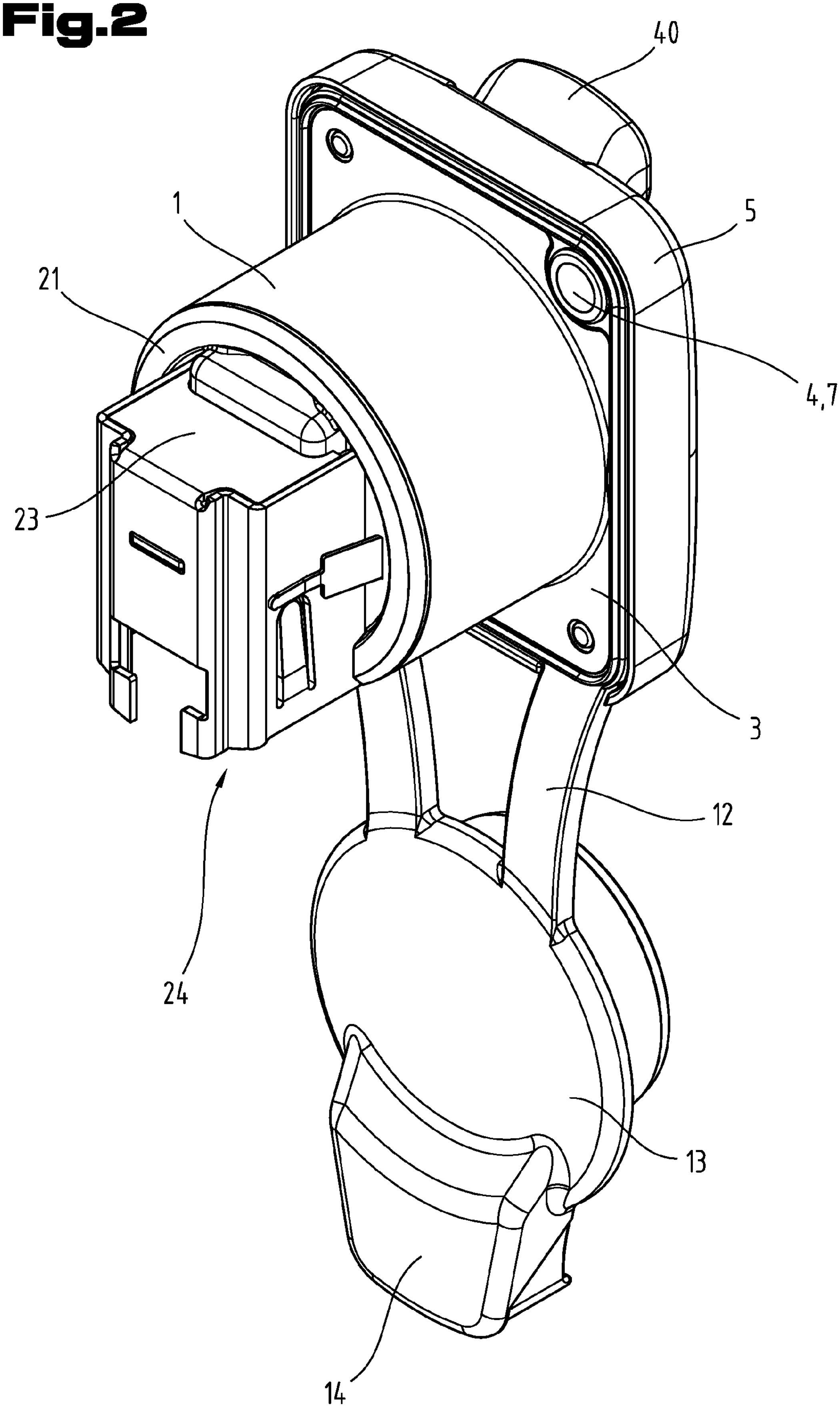
FIG. 2 shows the chassis socket of FIG. 1 in an oblique rear view.
Figure 3:
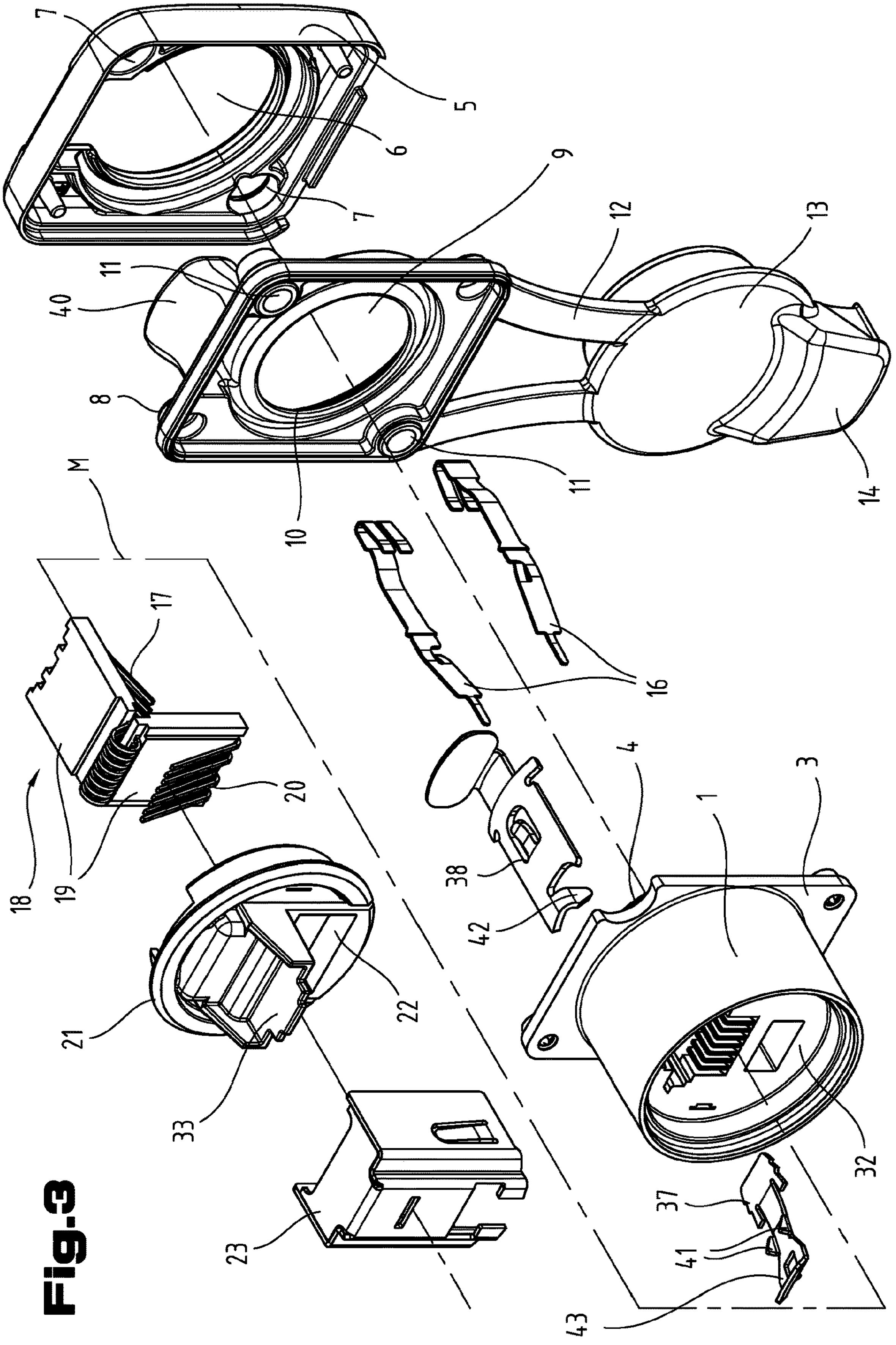
FIG. 3 shows an exploded representation of the chassis socket of FIG. 1.
Figure 4:
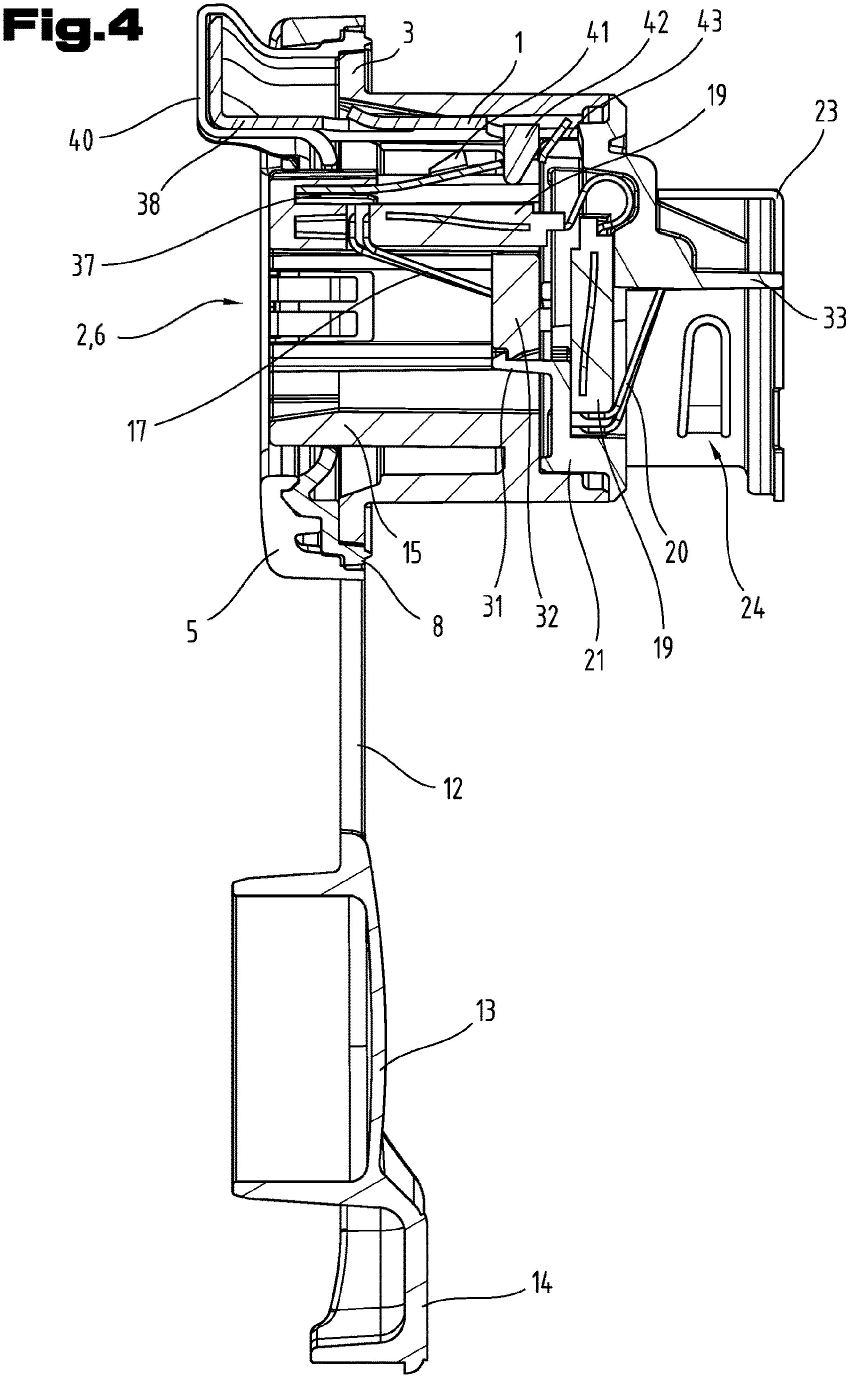
FIG. 4 shows a longitudinal section through the chassis socket of FIG. 1 in the vertical longitudinal center plane.

The electrical built-in connector in the form of a built-in connector socket or chassis socket of FIG. 1, represented in detail with all essential components, or assemblies, in an exploded representation in FIG. 3, comprises a housing 1 that has an insertion opening 2 for a complementary connector (not represented). At the insertion end, on the front side of the housing 1, a projecting connection flange 3 is provided, which preferably protrudes at right angles from the housing 1 and preferably over its entire circumference. The connection flange 3 also has through-openings or partially open recesses, or drilled mounting holes 4, through which fastening means, typically fastening screws, rivets or the like for the built-in connector can be passed in order to fix it in a wall of an item of equipment, a switchboard or in similar elements. The central axis M (see FIG. 3) of the insertion opening 2 preferably also represents the central and longitudinal axis of the housing, or of the connector as a whole. Obviously, other outline shapes of the connection flange 3, or numbers and arrangements of drilled mounting holes 4, are also possible.

When the built-in connector has been assembled, the front side of the connection flange 3 of the housing 1 is opposite an insertion-side flange plate 5. This has an insertion opening 6 for the complementary connector, arranged coaxially with respect to the insertion opening 2 of the housing 1. Furthermore, there are drilled mounting holes 7 formed in the flange plate 5, positioned coaxially with respect to the recesses 4 in the connection flange 3 and configured for leading through the fastening means for the built-in connector for the purpose of connecting to a wall of an item of equipment, a switchboard or the like.

Inserted directly between the flange plate 5 and the connection flange 3 of the housing 1, and held clamped between these components, is a preferably plate-like seal 8 for sealing with respect to the wall of an item of equipment, the switchboard or the like. This seal 8 has a central cutout 9, which corresponds in size at least to the insertion opening 2 and which is arranged coaxially with respect to the latter. Preferably, the central cutout 9 is delimited by a circumferential sealing lip 10, the inner diameter of which is slightly smaller than that of the insertion openings 2, 6 and which thus projects radially into the insertion openings 2, 6 and seals the annular gap between the outside surface of the inserted connector and the insertion openings 2, 6 when the complementary connector has been inserted. Through-openings 11 for the fastening elements are also formed in the seal 8 at the site of the drilled mounting holes 7 of the flange plate 5, or the recesses 4 of the connection flange 3.

In addition to the sealing of the insertion openings 2, 6 by the sealing lip 10 of the seal 8 when the complementary connector has been inserted, it is also advantageously possible to provide a seal in the non-connected state. For this purpose, there is at least one radially protruding connection strip 12 formed onto the seal 8. Fastened to the outer end of the connection strip 12 there is sealing plug 13, the outer diameter of which corresponds at most to the inner diameter of the insertion openings 2, 6 and which is preferably slightly larger than the inner diameter of the sealing lip 10 of the seal 8 that seals the insertion opening 2. Preferably, the sealing plug 13 is of an open pot-shaped design and preferably has a radially overlapping edge that projects fully over the insertion openings 2, 6. For easier handling of the sealing plug 13, a full-surface or preferably also open cup-shaped grip tab 14 protrudes from the side opposite the connection strip 12. This preferably covers the dome 40 completely and is flush with the flange plate 5 in the axial direction. This prevents water splashing directly onto the chassis socket from reaching the sealing lip 10 in the axial direction, which is particularly important for the dome 40 at the transition from the cylindrical to the rectangular region.

Realized preferably integrally with the housing 1 is an inner contact carrier 15 arranged concentrically with respect to the central axis M. If necessary, the contact carrier may also be formed by a separate insertion part fixed in the housing 1 by any retaining arrangements. Grounding contacts 16 are typically also held on the contact carrier 15. In the case of an embodiment in which there is a rear covering 23 in order to define a further insertion opening 24, these contacts are preferably routed up to this covering 23. The covering 23 itself in this case is made of electrically conductive material, preferably a thin hood made only of metal plate, and the grounding contacts 16 and covering 23 are connected both mechanically and in an electrically conductive manner, for example soldered. The grounding contacts 16 thus effect an electrical connection between the insertion opening 2 on the front side of the housing 1 and the insertion opening 24 on the rear side of the housing 1. In addition, they ensure the mechanical stability of the chassis socket by clamping together the housing 1 from its insertion side, the covering 23 and any components inserted in-between. With a covering 23 of this type made only of thin metal plate, a substantially smaller installation depth can be achieved compared to the known designs with metal-encased plastic housings.

However, the contact carrier 15 also accommodates the electrical contact elements 17, which serve to affect the electrically conductive connection to the plugged-in complementary connector. These contact elements 17 are part of a contact set 18, which also has at least one insulating body 19 made of electrically insulating material in its central portion, which fixes the contact elements 17 and their opposite ends, preferably likewise designed as further contact elements 20 for a further connector, in their relative position to one another.

Figure 5:
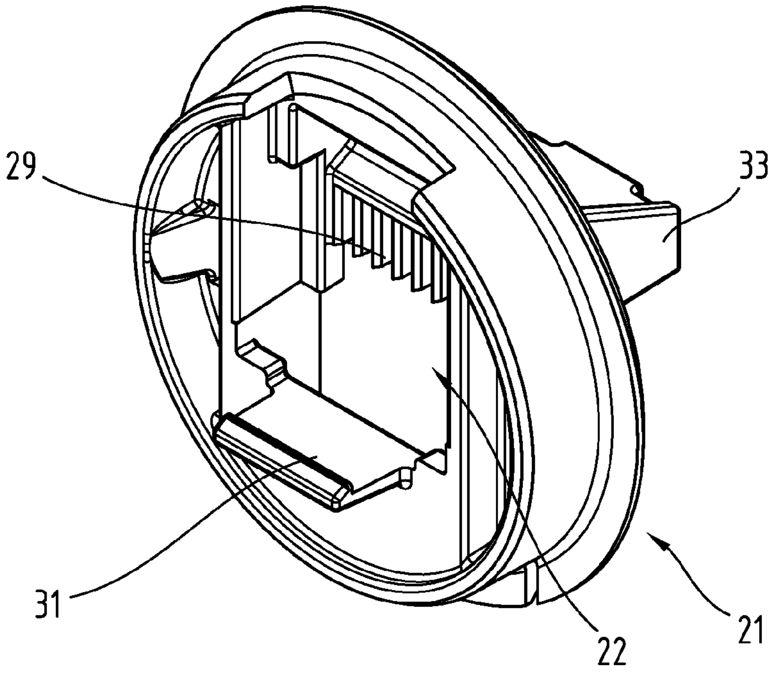
FIG. 5 shows view of a closure element, according to a preferred embodiment of the invention, realized as a housing cover, in an oblique front view from above.
Figure 6:
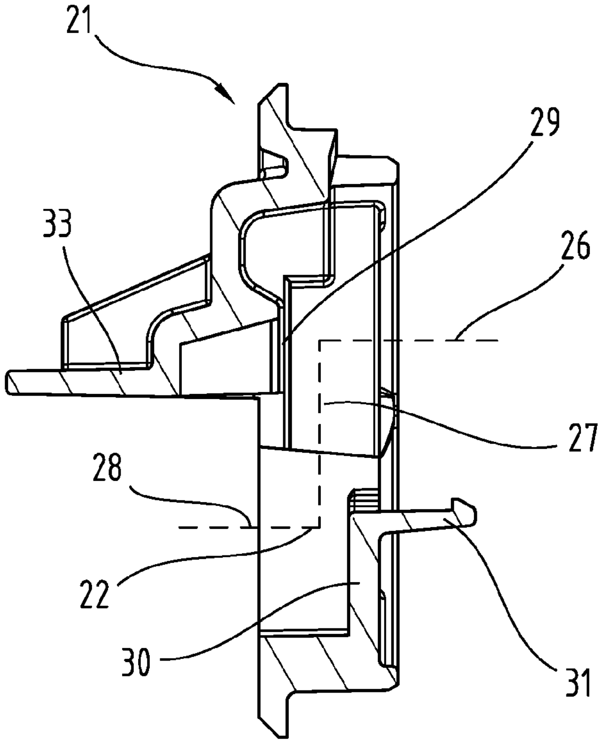
FIG. 6 shows a longitudinal section through the housing cover of FIG. 5, in the vertical longitudinal center plane.
Figure 9:
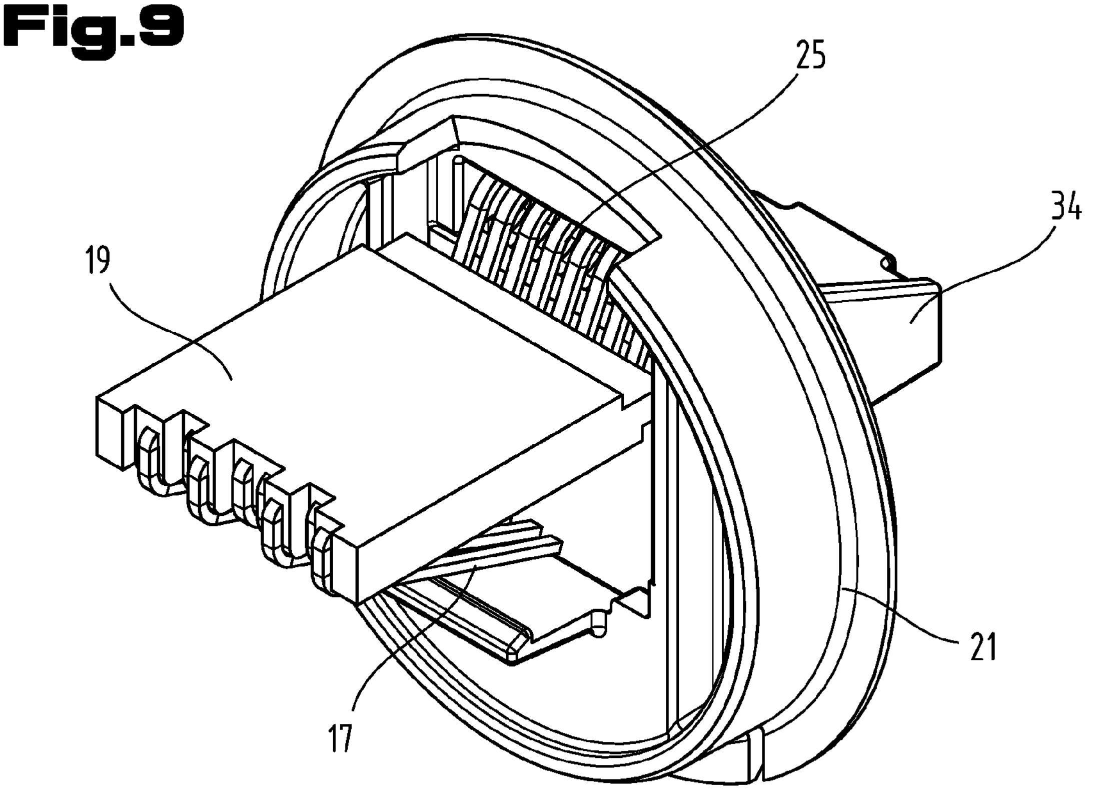
FIG. 9 shows, in an oblique front view from above, a housing cover according to FIG. 5 with the contact set according to FIG. 7 inserted.
Figure 10:
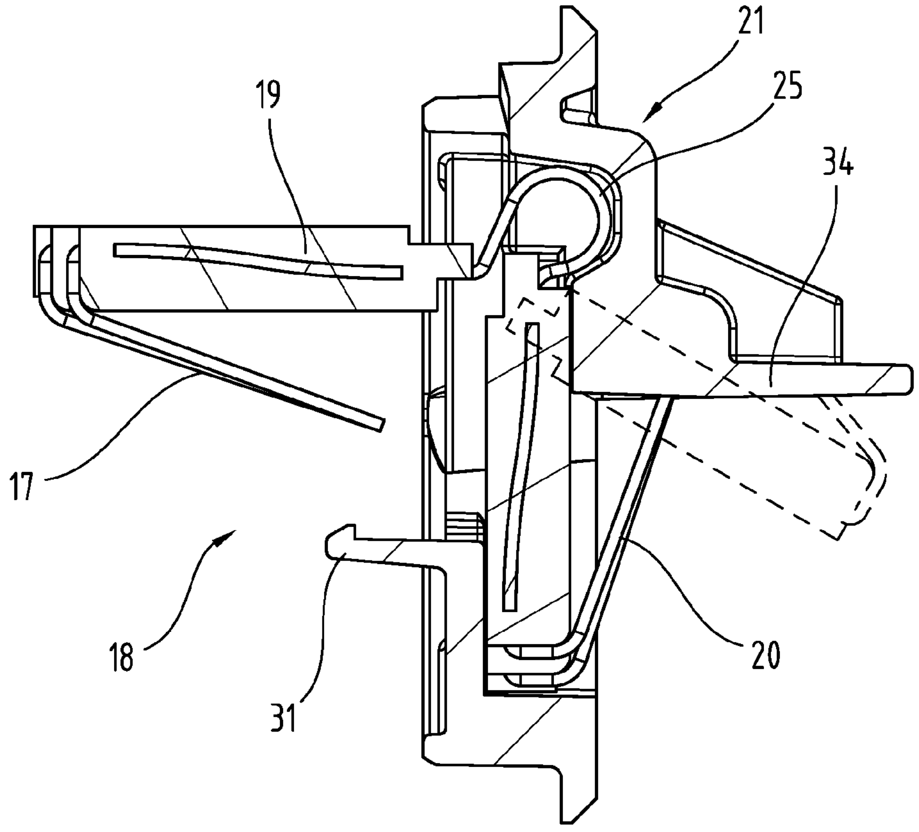
FIG. 10 shows a longitudinal section through an arrangement of FIG. 9, in the vertical longitudinal center plane.
Figure 11:
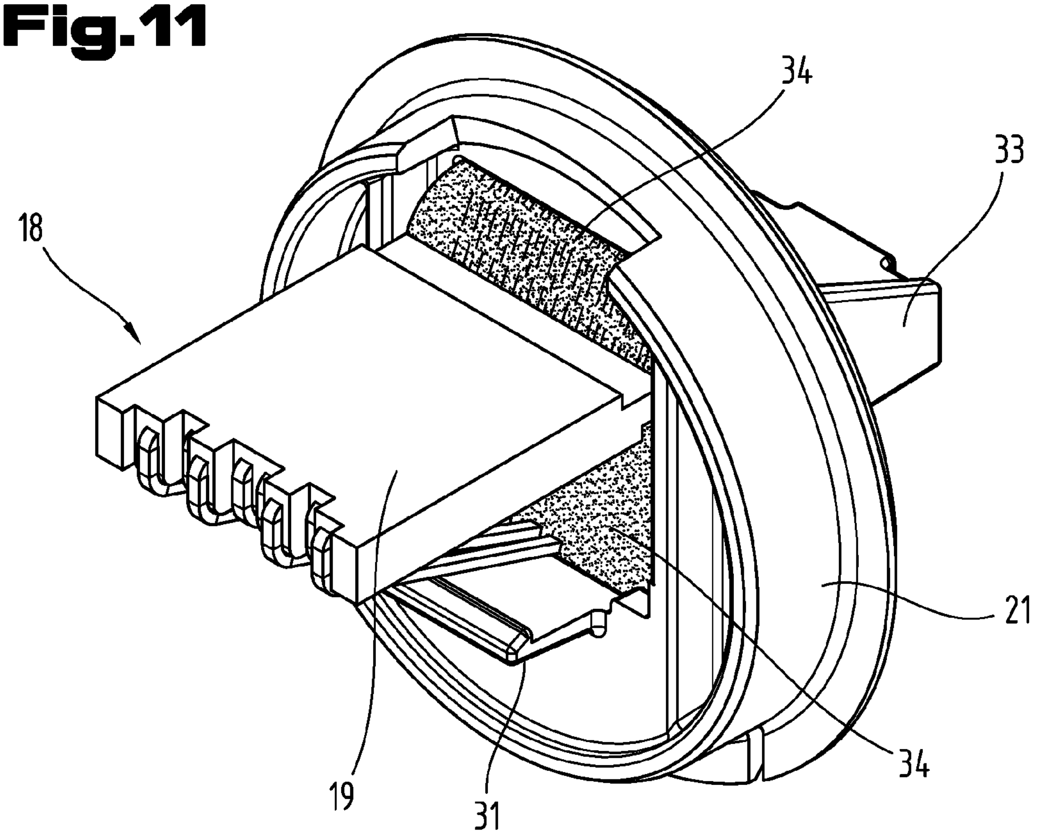
FIG. 11 shows, in an oblique front view from above, a housing cover according to FIG. 5 with the contact set according to FIG. 7 inserted and with a filling compound applied.
Figure 12:
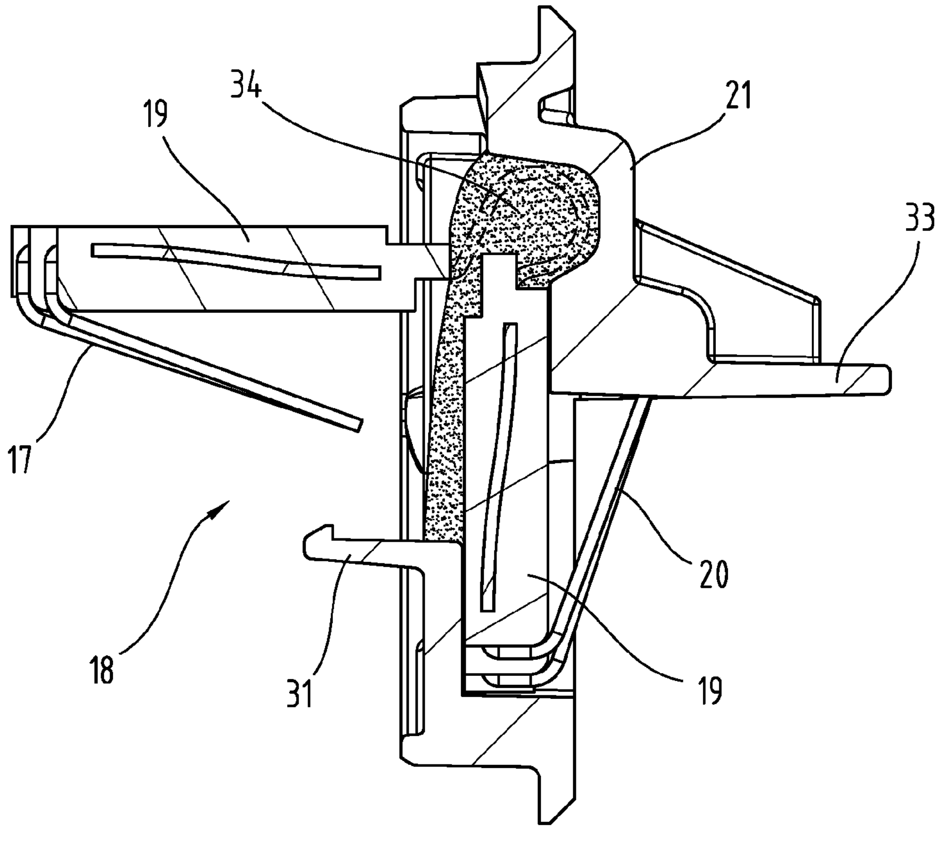
FIG. 12 shows a longitudinal section through the arrangement of FIG. 11, in the vertical longitudinal center plane.

In the represented preferred embodiment of the chassis socket, the contact elements 20 are routed back out through a closure element in the form of a housing cover 21, in particular through a passage 22 common to all contact elements 20 (see in particular FIGS. 5, 6 and 9), at the rear end of the housing 1. A covering 23, preferably made of metal, possibly also of plastic material, is placed on the rear side of the housing cover 21 and forms a protection for the contact elements 20 and a further connector socket, the insertion opening 24 of which is orientated transversely with respect to the central axis M of the housing 1, as is illustrated by the insertion axis N extending transversely with respect to this central, or insertion, axis M. However, the contact elements 17 may also be routed through the housing cover 21 to a circuit board, to which, or in which, they are soldered.

Figure 7:
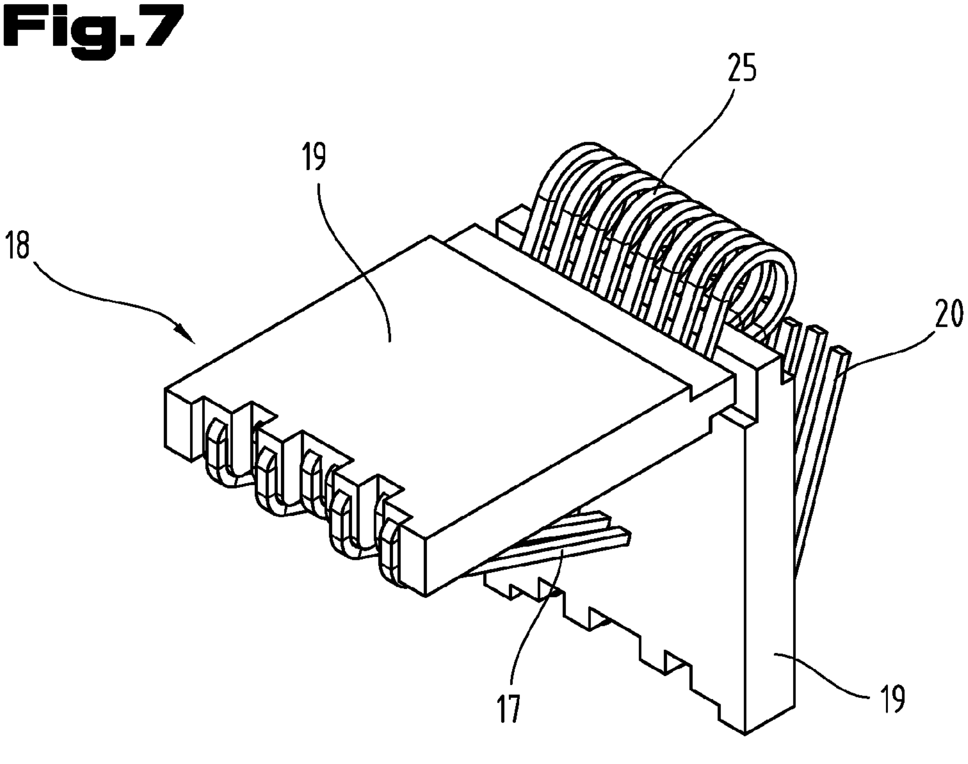
FIG. 7 shows view of a preferred embodiment of a contact set for a chassis socket, in an oblique front view from above.
Figure 8:
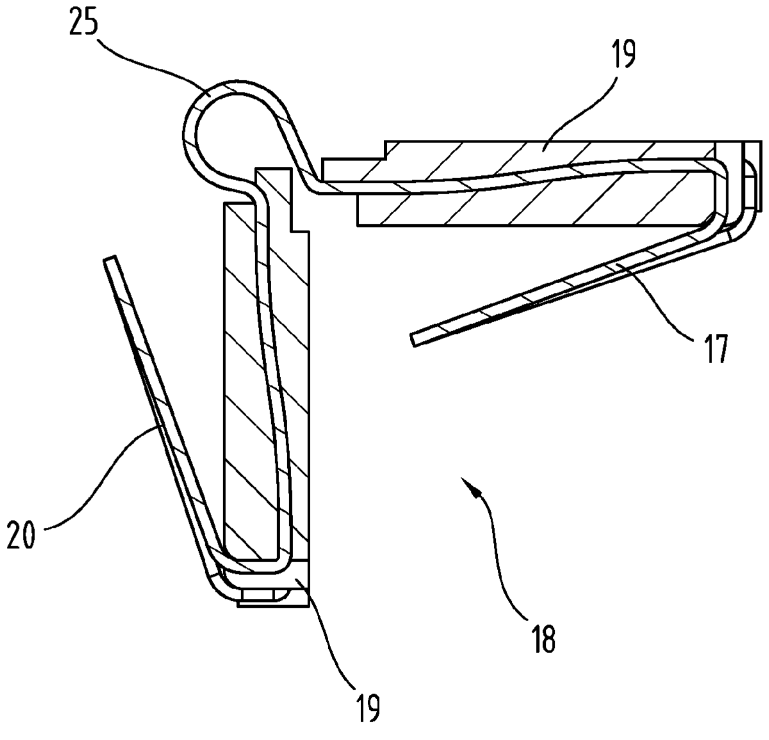
FIG. 8 shows a longitudinal section through the contact set of FIG. 7, in the vertical longitudinal center plane.

Optimally suited to use with a housing cover 21 as represented in a preferred embodiment in FIGS. 5 to 12 is a preferred embodiment of a contact set 18, which is explained in greater detail below with reference to FIGS. 7 and 8. The contact elements 17, 20 for the electrical contacting of complementary connectors, typically cable plug-connectors of data cables, in particular of the RJ45 type, in the insertion openings 2 and 24, respectively, are connected by parallel central portions 25, which in the present case of the preferred embodiment are not straight, as is the case for the standard designs of such contact sets that are substantially Z-shaped in longitudinal section, but are bent such that the insulating bodies 19 enclose an angle of between 60 and 150 degrees on both sides of the bend, and in special cases even elongate arrangements are used, the insulating bodies 19 of which together enclose an angle of 180 degrees with each other. Preferably, the central portion 25 is bent in such a way that the insulating bodies 19 located on either side of the central portion 25 of the contact set 18 together enclose an angle of approximately 90 degrees. Here also, as in many of these contact sets, individual pairs of contact elements 17, 20 are routed in a crossed manner within the insulating bodies 19 in order to improve the transmission properties. In these preferably two rectangular insulating bodies 19 made of electrically insulating material, typically insulating plastic, in which the contact elements 17, 20 are encapsulated, the contact elements 17, 20 are held fixed in their relative position to one another.

The ends of the contact elements 17, 20 are realized as terminal or contact pins and are bent back onto the nearest insulating body 19 fixing them, such that they include an angle of between 10 and 60 degrees with its surface. They may bear against the contact elements of the complementary plugged-in cable connectors under spring tension. The terminal or contact pins of the contact elements 17, 20 are equidistant from each other and substantially parallel to each other.

In order then to connect the two insertion openings 2, 24 to each other in an electrically conductive manner by means of the contact set 18, the closure element of the housing 1 that is realized as a housing cover 21—as represented in FIGS. 5 to 12—is provided with a passage 22. Its profile is indicated by dashed lines in the longitudinal section of FIG. 6. Coming from the front insertion opening 2, an input portion 26 preferably parallel to the longitudinal central axis M is preferably arranged a little above the horizontal central plane of the housing cover 21, or of the housing 1. This input portion 26 preferably continues, in the central plane of the housing cover 21, into a central portion 27 that is preferably parallel to this central plane, or to the plane of the rear housing peripheral edge. In the preferred embodiment represented, the input portion 26 and the central portion 27 are thus perpendicular to each other. Similarly, the central portion 27 then continues into an output portion 28, which is preferably again parallel to the longitudinal central axis M. This portion is preferably offset with respect to the horizontal central plane of the housing 1, or of the housing cover 21, on the opposite side of the input portion 26.

The output portion 28 and the central portion 27 therefore also preferably together enclose an angle of approximately 90 degrees. The input portion 26 and the output portion 28 are offset from each other on opposite sides with respect to the longitudinal central axis M.

This substantially Z-shaped passage 22 in the housing cover 21 is delimited, at the transition between the input portion 26 and the central portion 27, by a first stop face 29. Arranged at the transition between the central portion 27 and the output portion 28 there is a second stop face 30, which limits the passage 22 there.

The preferably rectangular contact set 18 can be inserted with one of its insulating bodies 19 into the central portion 27 of the passage 22, and in the fully inserted position then bears, mechanically fixed parallel to the plane of the housing cover 21 in the passage 22, against the stop faces 29, 30. The other insulating body 19 preferably projects forward parallel to the central axis M of the housing and the insertion opening 2 in the direction of the insertion opening 2 of the housing 1 and, upon the housing cover 21 being placed on the rear opening of the housing 1, is pushed into the contact carrier 15, such that it delimits the insertion opening 2 partially on the inside and the contact elements 17 project into the insertion opening. A locking tongue 31 engages, by means of a locking projection or a similar structure, behind a retaining edge or the like on the rear side of the base 32 of the contact carrier 15 and thus holds the housing cover 21 with the contact set 18 firmly fixed to the rear side of the housing 1 and of the contact carrier 15 during assembly, until finally the permanent mechanical fixing is effected by means of the grounding contacts 16. On the opposite side of the housing cover 21, the output portion 28 of the passage 22 is delimited on one side by a projection 33. This projection 33 forms an end stop for the inserted cable plug-connector in the rear insertion opening 24, and also simultaneously forms a carrier for the covering 23, which determines the position and orientation of this covering 23.

A particularly advantageous embodiment of a connector according to the invention has an arrangement of the housing cover 21 and the contact set 18 in which at least part of the passage 22 for the contact elements 17, 20 and/or for one of the insulating bodies 19 is filled with a hardened filling compound 34. The filling compound 34 can penetrate into all small gaps and cavities during insertion while still in a liquid or paste-like state, thus ensuring a comprehensive seal after it has hardened. Following hardening, the optimum mechanical connection between the contact set, closure element and housing is also ensured. In particular, that part of the passage 22 which forms the transition between the input portion 26 and the central portion 27, and in which the bent central portion 25 of the contact set will be positioned, is filled with the filling compound 34 and thus sealed in a watertight and dustproof manner. Also preferably covered by the filling compound is the surface, facing toward the front insertion opening 2, of the insulating body 19 that will be positioned in the central portion 27 of the passage 22.

For simple production of this tight-sealed construction variant of the chassis socket, it is advantageous that the insulating body 19 inserted in the central portion 27 of the passage 22 already bears very closely against the housing cover 21 at its edges and thus seals the not yet hardened filling compound 34. In this case, the filling compound 34 can be introduced directly into the arrangement of the housing cover 21 and contact set 18 without any further auxiliary seals, without it being able to leak out through gaps or clearances between the housing cover 21 and contact set 18 before hardening.

The housing cover 21 itself may—which is important, in particular, if there is no rear covering 23 as an anchoring point for a mechanical connection by means of the earthing contacts 16—be mechanically connected to the housing after it has been fitted into or attached to the rear end face of the housing 1. This can be achieved, advantageously, by tight adhesive bonding of the housing cover 21 and housing, by ultrasonic welding or other similar, known connection methods. A screw connection would also be conceivable. A sealing ring, if provided, may reinforce the sealing effect or provide it in the first place. Such a sealing ring may be positioned in a groove in at least the housing cover 21 and/or the housing 1.

Represented in FIGS. 15 to 18 is an arrangement of a contact set 18, a housing cover 21 and a rear covering 23 of a further embodiment of the invention. Used in this case is a contact set 18 of which the insulating bodies 19 adjoining the central, bent portion together enclose an angle of 135 degrees, as is clearly visible in the side view of FIG. 16. Since the front side of the chassis socket with the insertion opening 2 and the insulating body 19 with the contacts 17 typically remains coaxial with respect to the longitudinal central axis M of the housing 1, the rear insertion opening 24 consequently also extends at an angle of 135 degrees with respect to the longitudinal central axis M of the housing 1 and is swiveled by 45 degrees relative to the rear end face of the housing 1 and the plane of the housing cover 21, as is clear from FIGS. 15 and 18. Accordingly, the angle between the input portion 26 of the passage 22 for the contact elements through the housing cover 21 and the central portion 27 of the passage 22 is also equal to the angle between the insulating bodies 19. As can be seen from FIG. 17, however, the central portion 27 extends, in the same way as the insertion opening 24, at an angle of 45 degrees with respect to the plane of the housing cover 21.

For other angles between the insulating bodies 19, which may be between 90 and 180 degrees, the above explanations apply analogously.

Figure 13:
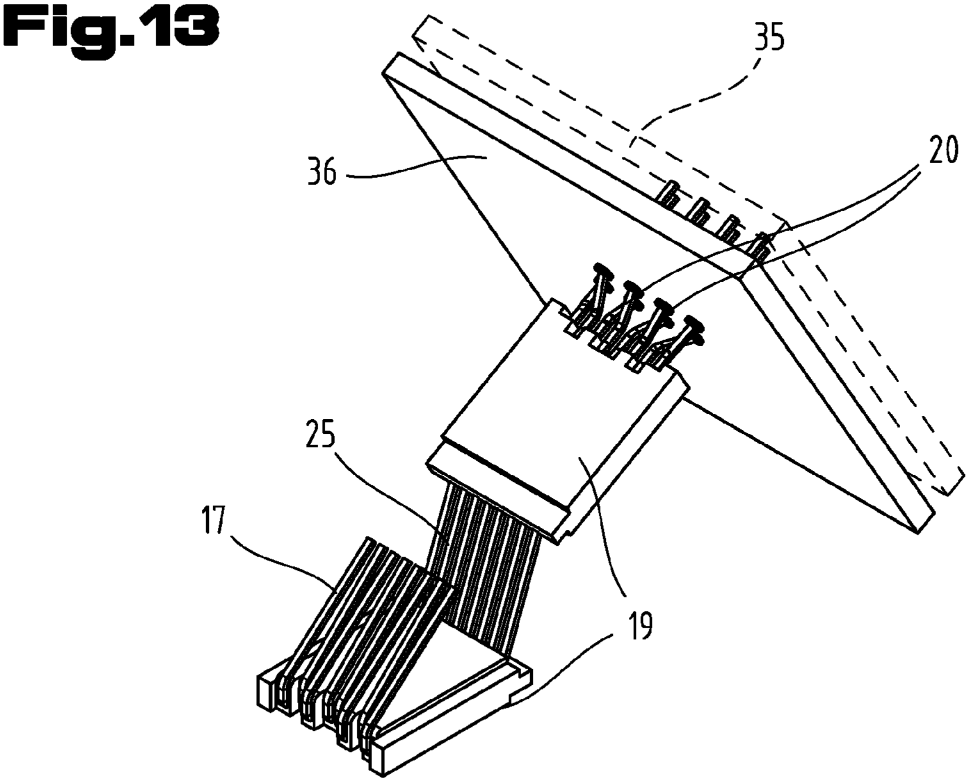
FIG. 13 shows another embodiment of a contact set according to the invention, together with a closure element realized as a circuit board, in an oblique front view.

A further embodiment variant of a chassis socket according to the invention has a differently designed closure element, for which a schematic representation, together with a contact set 18 having two insulating bodies 19, is depicted schematically in FIGS. 13 and 14, and which is intended for use with a housing 1, contact carrier 15 and any supplementary assemblies already described or detailed below.

According to this further embodiment, the closure element is a plastic plate or plastic disk 35, the shape of which is preferably selected to correspond to the cross-section of the rear edge of the housing 1 in order to be inserted therein or fixed therein by a press fit. The dimensions of the plastic plate 35 may also be configured to correspond to the contour of the rear edge of the housing 1 in order to be placed on the rear end face of the housing 1 and fixed there, for example by adhesive bonding, ultrasonic welding, crimping or screw connection. As can also be seen from the drawings, the housing 1 could be realized with a rectangular or square cross-section, for which purpose the represented rectangular, or square, closure elements in the form of the plastic disks 35 or the circuit board 36 are matched accordingly.

The peripheral edge of the plastic plate 35 or even the entire rear side of the housing 1 may be encapsulated in a sealing compound to achieve optimum tightness against water and dust. However, the closure element may also be made integrally with the housing 1, as its base.

The contacts 20 of the contact set 18 are again routed outward through the closure element and can be connected there to other terminal components, for example to a circuit board 36.

Figure 14:
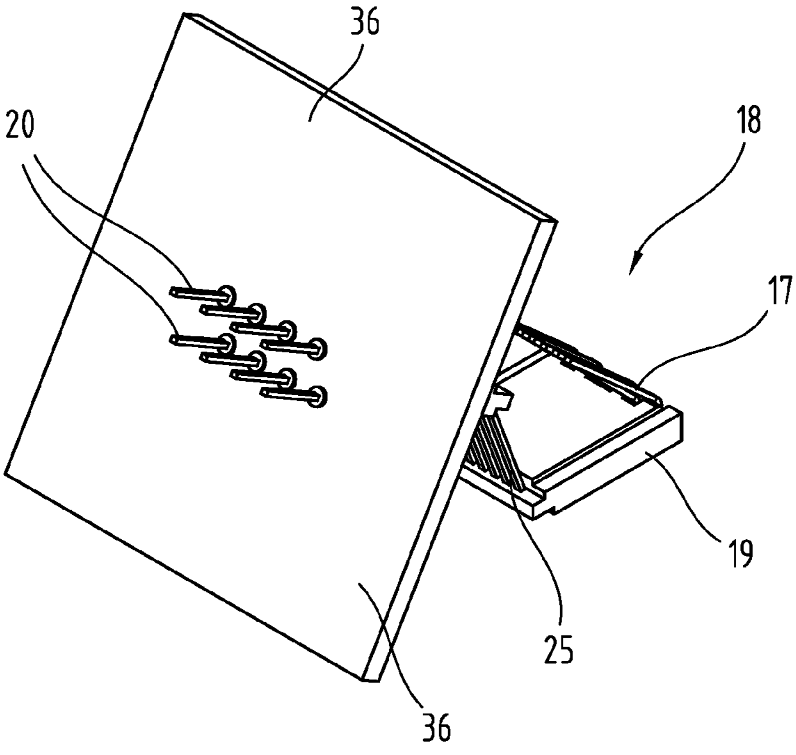
FIG. 14 shows the arrangement of FIG. 13, in an oblique rear view.
Figure 15:
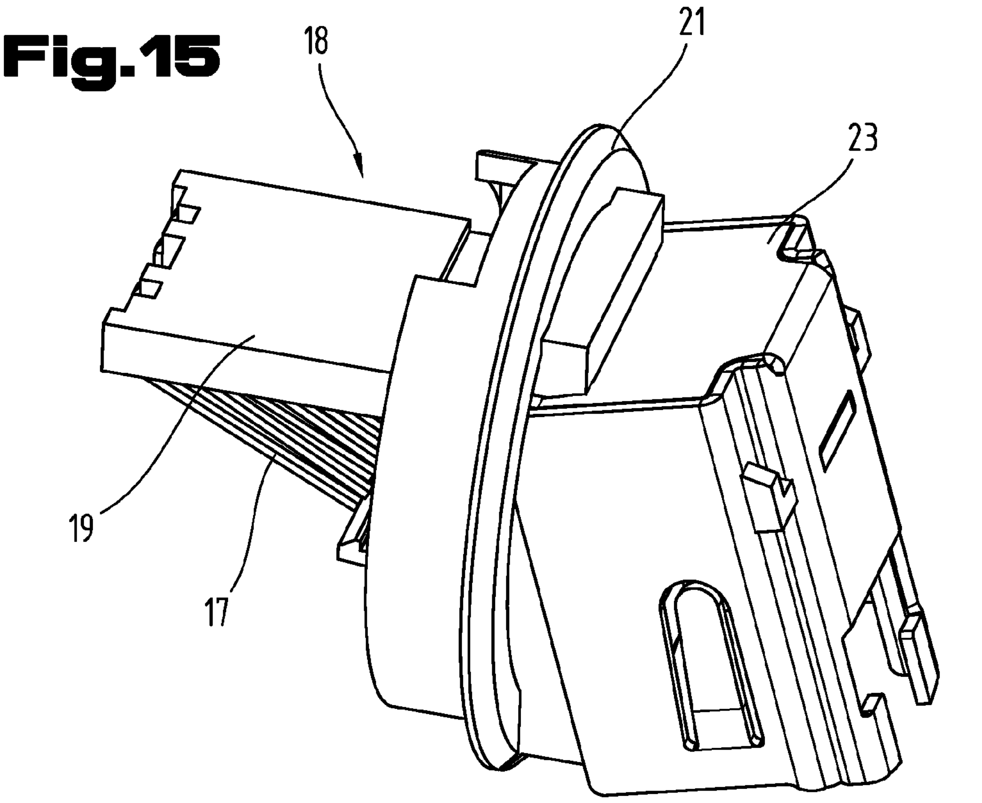
FIG. 15 shows a perspective view of an arrangement of a contact set, housing cover and rear covering, according to a further embodiment.
Figure 16:
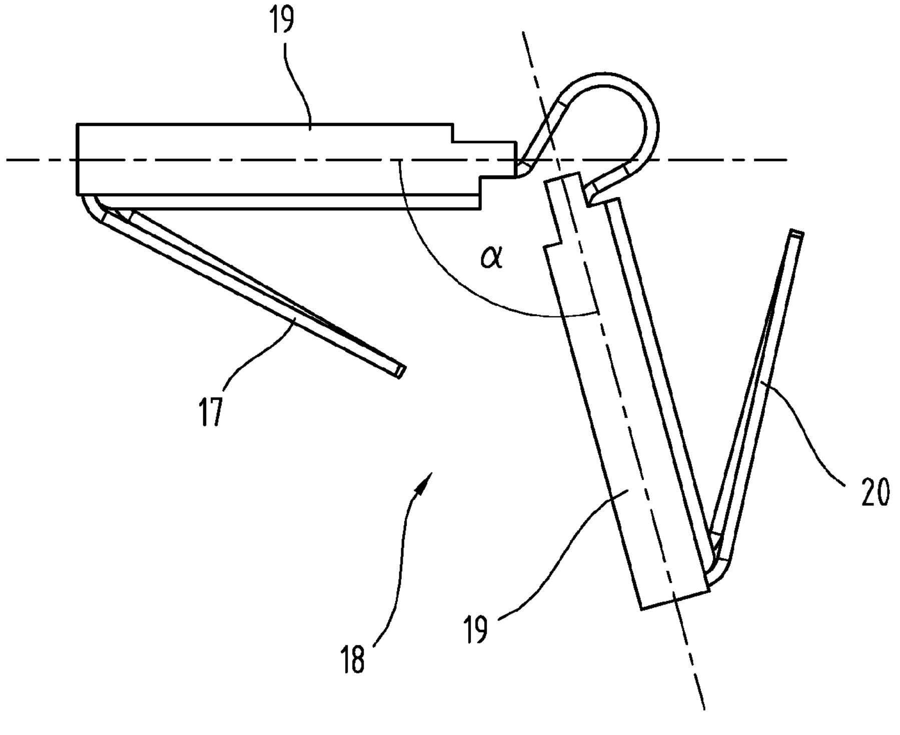
FIG. 16 shows a side view of the contact set of the arrangement of FIG. 15.
Figure 17:
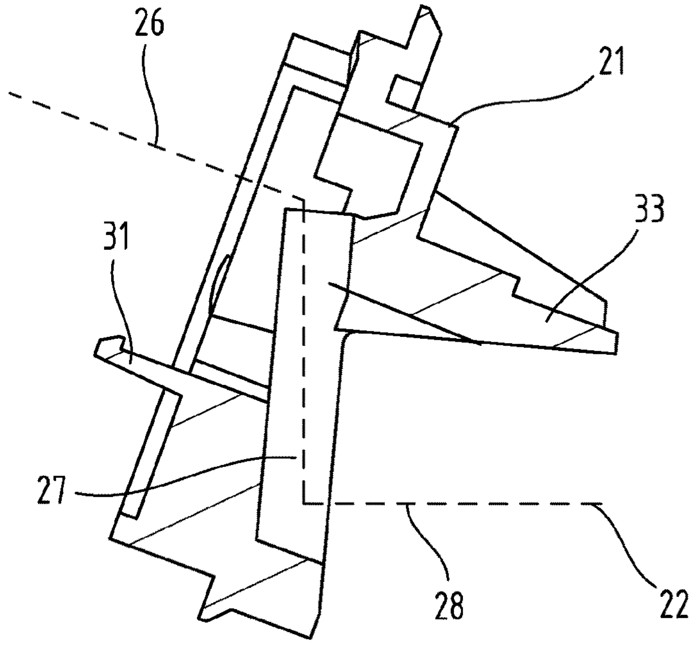
FIG. 17 shows a longitudinal section through the housing cover of the arrangement in FIG. 15.
Figure 18:
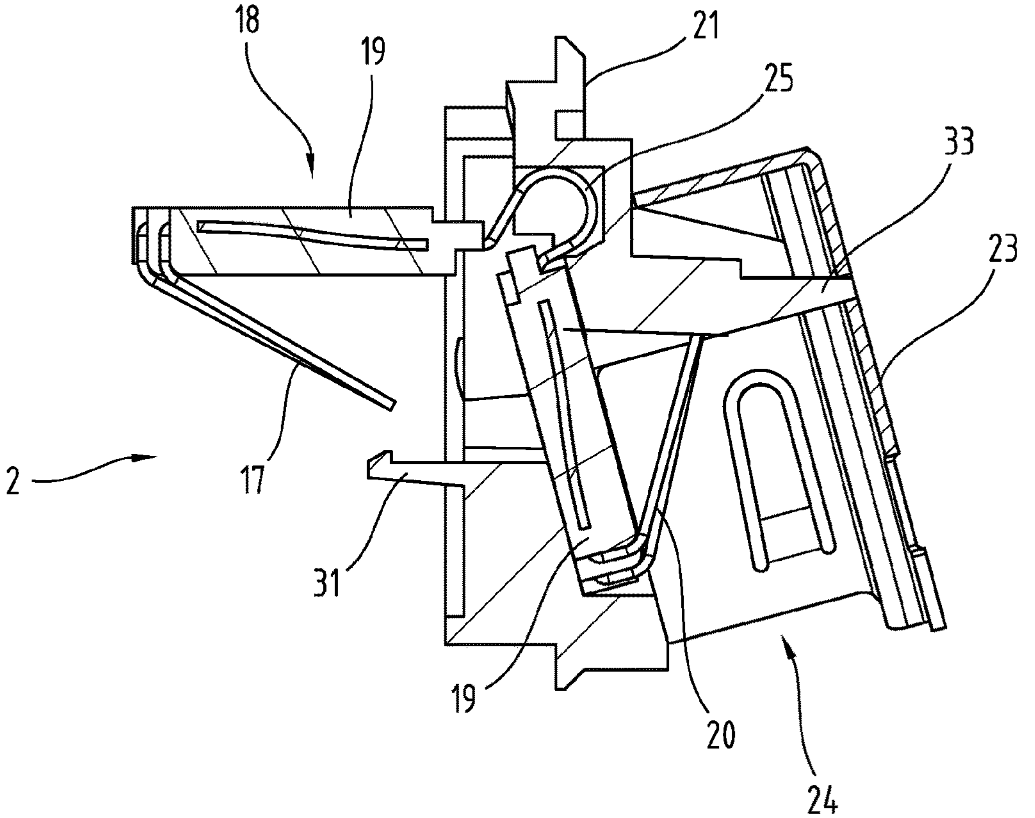
FIG. 18 shows a longitudinal section through the arrangement of FIG. 15 as a whole.

However, as realized by the embodiment of the invention represented in FIG. 14, such a circuit board 36 could also itself constitute the closure element. The above explanations apply analogously to its shape, arrangement and sealing.

In all these variants, the contact elements 20 of the complete contact set 18, with at least two insulating bodies 19 adjoining the central portion 25, are fixed in the plastic plate 35 or plastic disc by means of a press fit to seal against moisture, dust and dirt and are soldered, in any type of circuit board 36, at its soldering eyelets. In order to achieve the standard lengths inside the chassis socket, and thus the best possible compatibility with conventional systems, a complete contact set 18 is used, which in this case is in an elongate configuration. The insulating bodies 19 of the contact set 18 in this case together enclose an obtuse angle of greater than 135 degrees, as also represented in FIGS. 13 and 14. In this case the central portion 25 with its here preferably straight contact elements between the insulating bodies may be configured in such a way that the insulating bodies 19 are also oriented parallel to each other, in which case they may be arranged in parallel, mutually spaced planes or also in a plane-parallel manner. The use of a complete contact set 18 having two insulating bodies 19 also allows a design in which the ends of adjacent contact elements 20 in the insulating body 19—on the side of the contact set 18 opposite to the insertion opening 2—are bent away from each other perpendicularly to the plane of the insulating body 19, such that sufficiently large distances between the solder joints on a circuit board 36 are ensured. Compatibility can also be ensured by bending the contacts 20 in such a way that their ends can be connected to the circuit board 36 in accordance with standardized contacting schemes.

Finally, positioned in or on the housing 1 there is a locking arrangement 37, 38, at least one locking arm 37 of which can also be unlocked again by means of an actuating element 38. This actuating element 38 protrudes forwards with an operating lug 39 beyond the insertion-side end of the housing 1 so that it can be easily reached and actuated by the user. The operating lug 39 is preferably at right angles to the central axis M of the housing 1 and also to the longitudinal axis of the actuating element 38, bent upward about an axis orientated transversely with respect to the central axis M of the housing 1 and also to the longitudinal axis O of the actuating element 38. Preferably, the operating lug 39 is covered by a dome 40 inserted into or formed onto the seal 8. At the site at which the actuating element 38 is arranged there extends, from the insertion opening 2 of the housing 1 and also from the insertion opening 6 of the flange plate 5, a recess that extends radially outward and through which the actuating element 38 can project onto the front side of the flange plate 5.

The elastic locking arm 37 is mounted on the contact carrier 15, preferably in an elongate recess on the upper side, and has at least one locking structure on its side that faces away from the central longitudinal axis M of the housing 1, in this case in the form of two locking projections 41 that are bent upward at the outer edge of the flat locking arm 37 and have a nose shape in side view. By means of these locking projections 41, when a complementary connector has been inserted into the insertion opening, the locking arm 37 engages in corresponding complementary locking structures of this connector, preferably in at least one locking recess in a bush-shaped insertion section of this connector. This secures the inserted and locked cable plug-connector against unintentional or unwanted removal from the insertion opening 2. In order to enable or facilitate snapping of the locking projections 41 into the locking recess when the complementary connector is being inserted, these have a beveled edge, in a known manner.

In order to bring the locking arm 37 out of engagement with the locking structure of the inserted connector and to release it for removal from the insertion opening 2, the actuating element 38, starting from a passive position, represented in the drawing figures, in which it protrudes maximally forward beyond the housing 1, can be shifted backward, parallel to the longitudinal central axis M of the housing 1 and the contact carrier 15, into an active position. For this purpose, the actuating element 38 is mounted in a shiftable manner on the contact carrier 15, preferably above the locking arm 37 and preferably in the same recess of the contact carrier 15 as the latter, in order thereby to ensure optimum routing of the locking arm 37 and actuating element 38 relative to each another.

When the actuating element 38 is shifted from the passive position to the active position, an actuating portion 42 on the actuating element 38 preferably acts upon an inclined face 43 as the unlocking surface of the locking arm 37 and bends it in the direction of the central axis M of the housing 1 and the contact carrier 15, as a result of which the locking projections 41 come out of engagement with the locking structure of the inserted connector, thereby releasing it for removal from the insertion opening 2. If the actuating element 38 is released again by the user, the spring-elastic locking arm 37 moves back to its initial position, also shifting the actuating element 38 back to its passive position.

The actuating portion 42 is arranged at the outermost rear end of the actuating element 38 and is not overhung rearward by any other portion of the actuating element 38, i.e. in the direction of its longitudinal axis O, in the direction of the longitudinal central axis M of the housing 1 and also in the direction of the shift from the passive position to the active position. This results in a particularly short installation depth for the chassis socket that has a locking arrangement 37, 38 designed in this way. Preferably, the actuating portion 42 is formed by at least one tongue, which is bent around a bending axis orientated parallel to the longitudinal axis of the actuating element 38, or the longitudinal central axis M of the housing 1. Preferably, the actuating portion 42 has a beveled edge on its rear side. The rear end of the actuating element 38 is also easy to produce due to its open shape.

The inclined face 43 on the locking arm 37 is preferably arranged in the rear portion of the latter, to enable this component to be kept short while still maintaining sufficient lever action so that no excessive force has to be applied to shift the actuating element 38 from the passive position to the active position. It is therefore also advantageous for the locking arm 37 that the inclined face 43 for unlocking is not overhung by any portion of the locking arm 37. It is also particularly advantageous if the unlocking surface 43 is not protruded beyond by any portion of the actuating element 38, even if this is shifted as far as possible into the active position.

Instead of interacting inclined faces on the actuating element 38 and locking arm 37, only one of these components could also have such an inclined face and the other of these two parts could have a projection acting in combination with the inclined face. There could also be a separate spring-elastic element that loads the locking arm 37 into the locked position, and/or a further spring-elastic element could be provided to push the actuating element 38 back into the passive position when it is released by the user.

Instead of a spring-elastic design of the locking arm 37, it could also be pivotably mounted on the contact carrier 15 and loaded by a separate spring element into the position in which it engages in the locking structure of the complementary connector inserted into the housing 1.

If this short locking arrangement 37, 38 is used, the housing 1 of the chassis socket may have an inner length up to the rear closure element that coincides with the rear end of the locking arm 37, or with the rear end of the actuating element 38 in its maximum active position, in which it is shifted completely to the rear. This makes it possible to realize substantially shorter housings 1, and thus connector sockets that have a very small installation depth in the direction of insertion. This also applies in particular to embodiments in which arranged on the rear side of the housing 1 there is a further connector socket having an insertion opening 24, the insertion axis of which is orientated transversely or at least obliquely with respect to the longitudinal central axis M of the housing 1, or transversely with respect to the insertion axis of the first insertion opening 2.

The exemplary embodiments show possible embodiment variants, and it is to be noted at this point that the invention is not limited to the embodiment variants specifically represented, but rather that various combinations of the individual embodiment variants are also possible and that, due to the teaching, provided by the present invention, relating to the technical action, this possibility of variation is within the ability of a person skilled in the art in this technical field.

The scope of protection is determined by the claims. For interpretation of the claims, however, the description and the drawings are to be consulted. Individual features or combinations of features from the various exemplary embodiments shown and described may constitute independent inventive solutions. The object on which the independent inventive solutions are based may be learned from the description.

All specifications of value ranges in the present description are to be understood as including any and all sub-ranges thereof, e.g. the specification 1 to 10 is to be understood to include all sub-ranges starting from the lower limit 1 and the upper limit 10, i.e. all sub-ranges start with a lower limit of 1 or greater and end with an upper limit of 10 or less, e.g. 1 to 1.7, or 3.2 to 8.1, or 5.5 to 10.

Finally, for completeness, to facilitate understanding of the structure, it is to be noted that some elements have been represented out of scale and/or enlarged and/or reduced in size.

LIST OF REFERENCE DESIGNATIONS

1 housing
2 insertion opening
3 connection flange
4 drilled mounting hole
5 flange plate
6 insertion opening
7 drilled mounting hole
8 seal
9 cutout
10 sealing lip
11 through-openings
12 connection strip
13 sealing plug
14 grip tab
15 contact carrier
16 grounding contact
17 contact element
18 contact set
19 insulating body
20 further contact element
21 housing cover
22 passage
23 covering
24 second insertion opening
25 central portion
26 input portion
27 central portion
28 output portion
29 first stop face
30 second stop face
31 locking tongue
32 contact carrier base
33 projection
34 filling compound
35 plastic plate
36 circuit board
37 locking arm
38 actuating element
39 operating lug
40 dome
41 locking projection
42 actuating portion
43 inclined face
M longitudinal central axis
alpha angle between insulating bodies

The invention claimed is:

1. An electrical connector, for connection to cable plug-connectors of data cables, the electrical connector comprising:

a housing having at least one insertion opening for a cable plug-connector;

the housing including a contact carrier;

a contact set that has a central portion having parallelly-routed contact elements and, adjoining said central portion on both sides thereof, at least respectively one portion, and said portion on at least one of the sides having an insulating body enclosing and fixing the contact elements, wherein individual pairs of contact elements traverse through the insulating body and wherein the contact elements are located in the contact carrier at one end of the contact set and project into the insertion opening;

a closure element that closes the housing on the rear side opposite the insertion opening and has at least one leadthrough for at least one electrical contact element, wherein the contact set is at least mechanically connected to the closure element, and the contact elements at an end of the contact set opposite to the insertion opening are routed into the closure element or onto a rear side of the closure element;

wherein the closure element is formed by the base of an integral housing or a plastic plate, and the contact elements are routed outward through leadthrough openings in the base and are fixed mechanically and in a sealing manner in the leadthrough openings by a press fit.

2. The connector as claimed in claim 1, wherein the connector has a locking arrangement, for a plug connector inserted into the insertion opening, which comprises a locking element and an actuating element, wherein an actuating portion is arranged at the outermost rear end of the actuating element and is not overhung rearward by any portion of the actuating element, and wherein the locking element is not overhung by the outermost rear end of the actuating element in any position.

3. The connector as claimed in claim 1, wherein a projecting connection flange protrudes from an insertion-side end of the housing and has recesses for leading through fastening means, an insertion-side flange plate having an insertion opening for the complementary connector and having drilled mounting holes for connection to a wall of an item of equipment, a switchboard, is provided, and a seal that leaves the insertion opening free is inserted between the connection flange and the housing or between the flange plate and the connection flange.

4. The connector as claimed in claim 1, wherein the closure element is realized as a housing cover having a passage for receiving and mechanically fixing at least one portion of the contact set.

5. The connector as claimed in claim 4, wherein the closure element is inserted into or attached to the rear side of the housing and connected to the housing, by adhesive bonding or ultrasonic welding.

6. The connector as claimed in claim 5, further comprising a sealing ring inserted between the closure element and the housing, positioned in a groove in at least one of said closure element or housing.

7. The connector as claimed in claim 4, wherein the contact elements of the insulating body held in the central portion of the passage are covered on four sides by a hood made of thin metal plate, and one side is kept open as a second insertion opening, for at least one cable plug-connector.

8. An electrical connector, for connection to cable plug-connectors of data cables, the electrical connector comprising:

a housing having at least one insertion opening for a cable plug-connector;

the housing including a contact;

a contact set that has a central portion having parallelly-routed contact elements and, adjoining said central portion on both sides thereof, at least respectively one portion, and said portion on at least one of the sides having an insulating body enclosing and fixing the contact elements, wherein individual pairs of contact elements traverse through the insulating body and wherein the contact elements are located in the contact carrier at one end of the contact set and project into the insertion opening;

a closure element that closes the housing on the rear side opposite the insertion opening and has at least one leadthrough for at least one electrical contact element, wherein the contact set is at least mechanically connected to the closure element, and the contact elements at an end of the contact set opposite to the insertion opening are routed into the closure element or onto a rear side of the closure element;

wherein the closure element is realized as a circuit board having an electrical circuit and is inserted or attached in a sealed manner into or onto the rear side of the housing, and the contact elements are soldered to the circuit board.

9. The connector as claimed in claim 8, wherein said portion on each of the sides of the central portion includes a respective one of the insulating bodies that together enclose an obtuse angle of greater than 135 degrees along the course of the contact elements, and lie in the same or in parallel planes.

10. The connector as claimed in claim 8, wherein ends of contact elements located next to each other in the insulating body are bent away from each other perpendicularly to a plane of the insulating body and connected to the circuit board according to standardized contacting schemes.

11. An electrical connector, for connection to cable plug-connectors of data cables, the electrical connector comprising:

a housing having at least one insertion opening for a cable plug-connector;

the housing including a contact;

a contact set that has a central portion having parallelly-routed contact elements and, adjoining said central portion on both sides thereof, at least respectively one portion, and said portion on at least one of the sides having an insulating body enclosing and fixing the contact elements, wherein individual pairs of contact elements traverse through the insulating body and wherein the contact elements are located in the contact carrier at one end of the contact set and project into the insertion opening;

a closure element that closes the housing on the rear side opposite the insertion opening and has at least one leadthrough for at least one electrical contact element, wherein the contact set is at least mechanically connected to the closure element, and the contact elements at an end of the contact set opposite to the insertion opening are routed into the closure element or onto a rear side of the closure element;

wherein the closure element is realized as a housing cover having a passage for receiving and mechanically fixing at least one portion of the contact set; and wherein the passage comprises a central portion extending in a plane of the closure element, parallel to a plane of the rear peripheral edge of the housing, and respectively at least one input portion and output portion extending perpendicularly therefrom, wherein the input portion and the output portion are offset from each other.

12. The connector as claimed in claim 11, wherein said portion on each of the sides of the central portion includes a respective one of the insulating bodies, and the contact elements have at least one bend in the central portion of the contact set, such that the insulating bodies enclose an angle of between 60 and 180 degrees on both sides of the bend, and one of the two insulating bodies is held fixed in the central portion of the passage and is aligned parallel to the plane of the closure element, parallel to the plane of the rear peripheral edge of the housing.

13. The connector as claimed in claim 12, wherein at least a part of the central portion of the passage, also at least a part of at least the input portion or the output portion, is filled in a sealing manner with a hardened filling compound.

* * * * *